(12) United States Patent
Nurminen et al.

(10) Patent No.: US 11,689,887 B2
(45) Date of Patent: Jun. 27, 2023

(54) DETECTING MOBILE NODES TO IMPROVE RADIO-BASED POSITIONING PERFORMANCE

(71) Applicant: HERE GLOBAL B.V., Eindhoven (NL)

(72) Inventors: Henri Jaakko Julius Nurminen, Tampere (FI); Mikko Blomqvist, Lempäälä (FI)

(73) Assignee: HERE GLOBAL B.V., Eindhoven (NL)

( * ) Notice: Subject to any disclaimer, the term of this patent is extended or adjusted under 35 U.S.C. 154(b) by 228 days.

(21) Appl. No.: 17/128,130

(22) Filed: Dec. 20, 2020

(65) Prior Publication Data

US 2022/0095078 A1   Mar. 24, 2022

Related U.S. Application Data

(60) Provisional application No. 63/082,664, filed on Sep. 24, 2020.

(51) Int. Cl.
| | | |
|---|---|---|
| *H04W 4/029* | (2018.01) | |
| *G01S 5/02* | (2010.01) | |
| *G01S 5/00* | (2006.01) | |

(52) U.S. Cl.
CPC ............. *H04W 4/029* (2018.02); *G01S 5/017* (2020.05); *G01S 5/02526* (2020.05)

(58) Field of Classification Search
CPC ..... H04W 4/029; G01S 5/017; G01S 5/02526
See application file for complete search history.

(56) References Cited

U.S. PATENT DOCUMENTS

| | | | |
|---|---|---|---|
| 9,432,964 B2 | 8/2016 | Garin et al. | |
| 9,848,380 B1 * | 12/2017 | Ekambaram | H04W 56/0015 |
| 2002/0080759 A1 | 6/2002 | Harrington et al. | |
| 2007/0258408 A1 | 11/2007 | Alizadeh-Shabdiz et al. | |
| 2013/0051251 A1 | 2/2013 | Wang et al. | |
| 2014/0206379 A1 | 7/2014 | Mayor et al. | |
| 2016/0116274 A1 * | 4/2016 | Meredith | G01C 21/20 |
| | | | 702/150 |

OTHER PUBLICATIONS

Dongsu Han, et al., "Access Point Localization Using Local Signal Strength Gradient," S. Moon and R. Teixeira (Eds.): Network Measurement, LNCS 5448, pp. 91-100, (2009).

* cited by examiner

*Primary Examiner* — Joshua L Schwartz
(74) *Attorney, Agent, or Firm* — Peter H. Yu; Here Global B.V.

(57) ABSTRACT

Disclosed is an approach for improving performance of a radio-based positioning system by detecting and excluding mobile radio nodes. The disclosed approach involves processors (e.g., of positioning server(s) and/or of a computing device) making a determination (i) that a speed of a computing device is at or above a threshold speed, and (ii) that at least one condition is met, the at least one condition indicating that a radio node is moving substantially along with the computing device. In response to making the determination, the processors may deem the radio node to be a mobile node. Given this, the processors may in turn exclude the radio node for positioning purposes, which may ultimately improve performance of the radio-based positioning system.

19 Claims, 8 Drawing Sheets

DETECTING MOBILE NODES TO IMPROVE RADIO-BASED POSITIONING PERFORMANCE

CROSS REFERENCE TO RELATED APPLICATION

This application claims priority from U.S. Provisional Application Ser. No. 63/082,664, entitled "Detecting Mobile Nodes to Improve Radio-Based Positioning Performance," filed on Sep. 24, 2020, the contents of which are hereby incorporated herein in their entirety by this reference.

FIELD OF THE DISCLOSURE

Embodiments of the present disclosure relate to the field of positioning technologies, and more specifically to methods and systems for improving positioning performance.

BACKGROUND

In practice, positioning technologies could provide for numerous benefits, such as by enabling tracking of assets and/or navigation through indoor and outdoor environments, among other possibilities. Such benefits may be realized through the development of positioning system(s) and associated service(s) that may collectively provide a solution to various positioning-related use cases. Generally speaking, a positioning solution can be commercially successful if it is globally scalable, has low deployment and maintenance costs, and offers an acceptable end-user experience. To facilitate this, the solution could be based on existing infrastructure in buildings and on existing capabilities in consumer devices, such as on radio (e.g., Wi-Fi and/or Bluetooth) technologies that are already supported in numerous consumer devices on the market.

One approach for such radio-based positioning could involve crowdsourced collection of radio data from mobile devices, which may then be used for generating or updating radio map(s). This radio data may represent measurements of radio signals respectively observed by the mobile devices, which may include received signal strength value(s) and/or respective identifiers of radio node(s) emitting those signal(s), among other options. And once a radio map is generated or updated based on this data, the radio map may effectively model a radio environment in an indoor and/or outdoor area, and could enable an entity (e.g., a server or a mobile device) to determine characteristics of radio signals that are expected to be observable respectively at different locations in the area. Given this, the entity could compare further (e.g., radio) measurements from a mobile device to the radio map, to estimate a position of the mobile device in the area.

In some situations, however, certain crowdsourced data may not be suitable for use as basis to generate or update a radio map. And if such unsuitable data is inadvertently used as basis for generating or updating a radio map, the radio map may not accurately model a radio environment in an area, thereby degrading the radio-based positioning performance.

One example of such unsuitable data is data associated with mobile radio nodes, which may include e.g., radio nodes deployed in moving vehicles or mobile devices providing Wi-Fi hotspots, among others. More specifically, radio signals observable at a given location may have predictable characteristics in accordance with a radio map, as long as the radio environment remains unchanged e.g., due to stationary radio node(s) emitting those radio signals. Yet, if a radio map is generated based on data collected when a radio node is at one location and that radio node then moves to a different location, the radio environment will change and will no longer be accurately represented by the radio map. Consequently, after the radio node at issue moves, use of that radio map may lead to inaccurate position estimates.

Given this, it is beneficial to identify mobile radio nodes and/or any other radio nodes that tend to cause inclusion of unsuitable data in radio map(s), so that data associated with such nodes is removed or otherwise prevented from inclusion in radio map(s). For instance, this may involve removing from a radio map and/or preventing inclusion in the radio map of (i) received signal strength values for signals emitted by mobile radio node(s) and/or (ii) respective identifiers of those mobile radio nodes, among other possibilities.

Unfortunately, there are various deficiencies with respect to existing techniques for identifying such unsuitable nodes and/or data. For instance, machine learning techniques could be applied to determine which radio nodes are mobile, but such techniques tend to be computationally intensive and/or prone to errors. Additionally or alternatively, such techniques may rely on there being a certain extent of available crowdsourced data, but such an extent may not always be available. Therefore, a technical improvement is desired and would advantageously help improve performance of radio-based positioning systems.

SUMMARY

Disclosed herein is an improved approach for detecting mobile radio node(s), so that those node(s) can be excluded for positioning purposes. This approach has been developed through a unique realization that a mobile radio node can be detected when certain condition(s) are met. Such conditions may indicate that a computing device and the radio node are moving roughly at the same speed and in the same direction of travel, perhaps for a sufficient duration of time. In practice, these condition(s) can be met in various scenarios, such as e.g., when the computing device is on board a moving vehicle that hosts the radio node (e.g., a WiFi access point fixed to a bus, train, ship, or the like), among numerous other possibilities.

Given this, the disclosed approach may involve processor(s) of a positioning system or of a computing device making a determination that the computing device is moving at a high speed and that a radio node is moving substantially along with that device. In this regard, various conditions may indicate that the radio node is moving along with the high-speed computing device. For example, processor(s) could determine that the computing device is connected to the radio node, perhaps for a sufficiently long period of time. In another example, processor(s) can determine that received signal strength associated with the radio node remains strong for a sufficiently long period of time. These and other conditions are further contemplated herein.

Once processor(s) make the above-mentioned determination, the processor(s) can then deem the radio node to be a mobile radio node, which may in turn help the processor(s) exclude that radio node for positioning purposes. Such excluding could involve removal of data associated with that radio node from radio map(s) and/or blacklisting of that node to prevent inclusion of such data in radio map(s), among other options. Additionally or alternatively, the excluding at issue could involve labeling data associated with that radio node being less reliable than it otherwise would be, so that the data can be deemed to be less trustworthy when a radio map including that data is used for positioning.

In this way, the disclosed approach may help speed up accurate detection of mobile radio nodes and their exclusion from positioning, without adding significant costs (e.g., energy, data storage, and/or data transmission costs) to a positioning system. As such, the disclosed approach may help significantly improve the quality of radio map(s) to enable more accurate position estimates, which are important for various use cases.

By way of example, accurate position estimates are important in tracking-related use cases. In particular, incorrect position estimates are especially unwelcome in tracking systems because they may lead to incorrect assessment of asset whereabout, incorrect geofence transitions, and/or incorrect time-of-arrival estimates, among other problems. Such tracking systems are often relied upon in logistics use cases involving transportation mechanism (e.g., vehicles, ships, and/or trains) that frequently host mobile radio nodes, thereby making the above-described issues associated with mobile radio nodes even more prevalent in such use cases. Thus, the disclosed approach may be particularly beneficial for improving performance of such tracking systems. Other examples and advantages are also possible.

Accordingly, in one aspect, disclosed is a method. The method involves: making a determination, by one or more processors, (i) that a speed of a computing device is at or above a threshold speed, and (ii) that at least one condition is met, the at least one condition indicating that a radio node is moving substantially along with the computing device; and in response to making the determination, deeming, by the one or more processors, the radio node to be a mobile node, thereby enabling exclusion of the radio node for positioning purposes.

In another aspect, disclosed is an apparatus including one or more processors, a non-transitory computer readable medium, and program instructions stored on the non-transitory computer readable medium. The program instructions may be executable by the one or more processors to perform any operations described herein, such as any of those set forth in the disclosed method, among others.

In yet another aspect, disclosed is a non-transitory computer readable medium having stored thereon instructions executable by one or more processors to cause a computing device or a server device to perform operations described herein, such as any of those set forth in the disclosed method, among others.

These as well as other features and advantages of the invention will become apparent from the following detailed description considered in conjunction with the accompanying drawings where appropriate. It should be understood, however, that the drawings are designed solely for purposes of illustration and not as a definition of the limits of the present disclosure. It should be further understood that the drawings are not drawn to scale and that they are merely intended to conceptually illustrate one or more of the features described herein.

DETAILED DESCRIPTION

Figure 1:
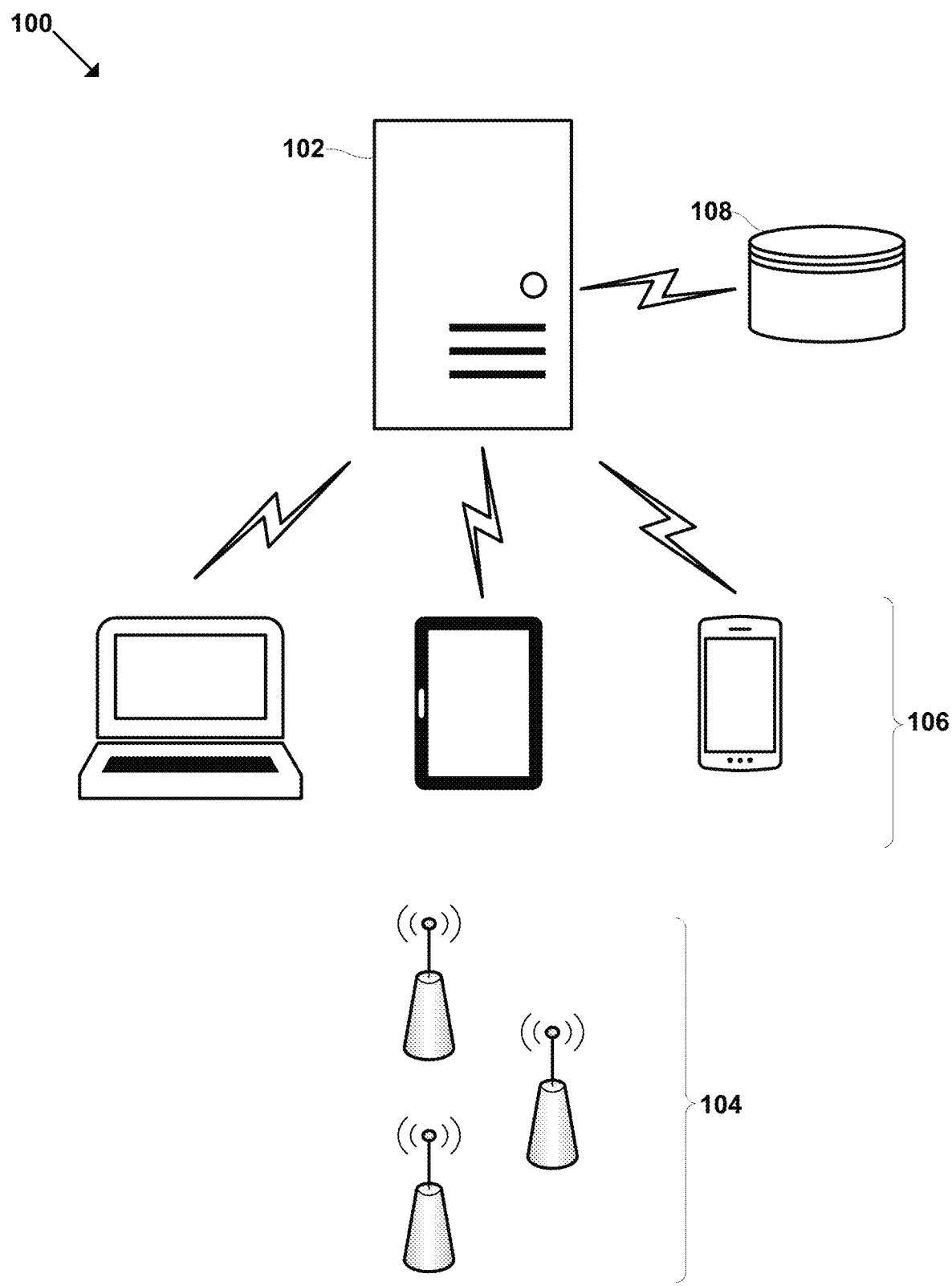
FIG. 1 illustrates an arrangement that may enable a positioning solution, in accordance with an example implementation.

Some embodiments of the present disclosure will now be described in more detail with reference to the accompanying drawings, in which some, but not all, embodiments of the present disclosure are shown. Indeed, various aspects of the present disclosure may be embodied in different forms and should not be construed as limited to the embodiments set forth herein.

I. Example Positioning Systems

Positioning methods that are seamless and available at all times might rely upon novel systems and solutions that are specifically developed and, if necessary, deployed for this purpose. Traditional positioning technologies, which are mainly used outdoors (e.g., satellite and cellular positioning technologies), cannot always deliver the desired performance that would enable a seamless navigation experience at all times, particularly indoors. For instance, in the case of indoor positioning, satellite-based radio navigation signals simply do not penetrate through the walls and roofs sufficiently for adequate signal reception and cellular signals often have a bandwidth that is too narrow for accurate ranging by default. And in the case of outdoor scenarios, there may be situations where e.g. satellite-based radio navigation provides for insufficient coverage, such as in the event of bad weather or in urban street canyons.

Several dedicated solutions have already been developed and commercially deployed during past years, such as solutions based on technologies like pseudolites (GPS-like short-range beacons), ultra-sound positioning, Bluetooth or Bluetooth LE signals, and wireless local area network (WLAN) fingerprinting. What is typical to these solutions is that they tend to involve either deployment of totally new infrastructure (such as beacons or tags) and/or manual exhaustive radio-surveying of streets and buildings, including all the floors, spaces and rooms. Using such solutions may be rather expensive and will likely take a considerable amount of time to build the coverage to the commercially expected level. Also, the diversity of these technologies makes it difficult to build a globally scalable indoor positioning solution, and integration and testing will become complex if a large number of technologies needs to be supported in consumer devices.

A commercially successful positioning solution would likely be globally scalable, have low maintenance and deployment costs, and offer acceptable end-user experience. To facilitate this, the positioning solution can be based on existing infrastructure in the buildings and on existing capabilities in the consumer devices. For example, the positioning solution could be based on technologies like Wi-Fi and/or Bluetooth, which are already supported in numerous devices, such as smartphones, tablets, laptops and even in the majority of the feature phones. Thus, it is advantageous to develop a positioning solution that uses cellular and/or non-cellular radio signals in a way that (i) makes it possible to achieve desired horizontal and vertical positioning accuracy and (ii) provides the ability to quickly build global coverage.

FIG. 1 illustrates an arrangement 100 that may enable a positioning solution, in accordance with example implementations. Arrangement 100 could include a server system 102, radio devices 104 (could also be referred to as radio nodes or the like), one or more mobile devices such as mobile devices 106, and a database 108. The server system 102, radio devices 104, mobile device(s) 106, and/or database 108 may be configured to communicate with one another via one or more communication links (e.g., via a cellular and/or a non-cellular communication network).

As an initial matter, a mobile device could be any electronic device that is movable from one position to another. For example, the mobile device(s) 106 could be or otherwise include cellular phone(s), personal digital assistant(s), a laptop computer(s), tablet computer(s), and/or wearable device(s), among other options.

Further, radio devices 104 may include any type of device that is configured to emit (and optionally receive) radio signals. For example, the radio devices 104 could include wireless WLAN access point(s), such as a WLAN access point that supports or is otherwise configured according to the IEEE 802.11 standard (e.g., a Wi-Fi access point). Additionally or alternatively, the radio devices 104 could include Bluetooth beacon(s) and/or cellular network node(s) (e.g. Global System for Mobile Communications (GSM), Universal Mobile Telecommunications System (UMTS), Long Term Evolution (LTE), and/or 5G base station(s)), among other options.

Furthermore, server system 102 could take various forms without departing from the scope of the present disclosure. By way of example, server system 102 could include a single server or a plurality of servers (e.g., forming a server cloud). Moreover, server system 102 could be embodied as a positioning server of a positioning system, such as of a non-GNSS based radio positioning system for indoor and/or outdoor positioning.

In practice, a non-GNSS based radio positioning system could include or otherwise rely on radio devices (e.g., radio devices 104) to support the positioning solution described herein. Such radio devices may include dedicated radio devices (e.g., Bluetooth beacons) that are installed in the environment for which the positioning solution is provided. Additionally or alternatively, the non-GNSS based radio positioning system could make use of existing radio devices, such as WLAN access points and/or cellular network nodes. In any case, the radio devices could be deployed in a particular area, such as an indoor area.

Given this arrangement 100, the server system 102 could generate and/or update a radio map for an area, which may in turn enable position estimations for mobile device(s) in the area. Namely, the radio map could enable an entity (e.g., a server system or a mobile device) to determine characteristics of radio signals (e.g., transmitted by radio devices) that are expected to be observable respectively at different locations in the area. Accordingly, the term radio map may refer to any collection of data that provides location-linked information on a radio environment.

To help facilitate generation or updating of a radio map, server system 102 could collect "fingerprint(s)" from mobile device(s). A fingerprint collected from a given mobile device may contain or otherwise represent a position estimate and measurement(s) by the mobile device. The position estimate may be, for example, based on GNSS data, sensor data, and/or previously collected radio measurements, or may be manually inputted via a user interface. And the measurements may include, for example, radio signal parameter(s) of observed radio signals measured by a mobile device and/or identifiers of radio device(s) that emitted the observable radio signals, among others. In more specific examples, collected fingerprint(s) may respectively contain any feasible combination of the following types of measurements: global and/or local identifier(s) of cellular network node(s), Wi-Fi access point identifier(s), beacon identifier(s), signal strength measurement(s) (e.g., Received Signal Strength (RSS)), pathloss estimate(s), timing measurement(s) (timing advance or round-trip time), speed data, reference position measurement technology, collection device information, battery level data, and/or environment sensor data etc. Other examples are also possible.

In some implementations, collected fingerprints could enable generating or updating of a radio map for a 3D positioning solution e.g., in multi-level buildings. In particular, features of radio signals (e.g., received signal strength) that may be used for horizontal positioning may vary significantly from one building layer to another in different altitude levels at the same horizontal position, often due to the radio signal attenuation caused by a building's structure. This might affect the eventual performance of a radio-based positioning system. Therefore, it would be particularly beneficial for a radio map to indicate characteristics of radio signals that are expected to be observable respectively at different attitudes/floors of a multi-level building.

Given this, collected fingerprint(s) could additionally or alternatively include data representing or otherwise enabling determination of altitude(s) of mobile device(s). In particular, fingerprint(s) may include altitude data representing absolute and/or relative altitude(s) of a mobile device. Additionally or alternatively, fingerprint(s) may include pressure data representing pressure measurements, and such pressure data can be used to determine altitude(s) and/or altitude changes, e.g., according to a predictable relationship between pressure and altitude.

In practice, there may be various approaches for determining or otherwise generating altitude data. In one example, altitude data could be determined according to GNSS-based altitude estimate(s), which may work relatively well outdoors in good signal conditions, but may be unavailable or inaccurate indoors. In another example, altitude data could be determined according to an altitude map representing altitudes respectively at different locations. In yet another example, a barometer (e.g., in a mobile device) may provide altitude/pressure data (e.g., pressure measurements) that can be used to estimate or determine altitude changes of a mobile device. In this regard, reference altitudes, which may be GNSS-based and/or based on an altitude map, could be used in combination with altitude changes determined according to barometer measurements, so as to determine new altitude(s) of a mobile device. Other examples are also possible.

Generally, altitude data in a given fingerprint could represent altitude(s) of a mobile device substantially at the time the mobile device observed or otherwise determined certain (e.g., radio) measurements. For instance, a mobile device could provide, to server system 102, a fingerprint including radio measurement(s) by the mobile device and altitude data representing an altitude of the mobile device substantially during the radio measurement(s). And if the server system 102 has information indicating respective altitude(s) of floor(s) in a building, the altitude data in the fingerprint could be used to determine floor(s) at which the radio measurement(s) were performed. As such, server system 102 could associate certain altitude data with certain radio measurements, so as to generate or update a radio map to accurately represent characteristics of radio signals expected to be observable respectively at different attitudes/floors of an indoor area, which in turn could enable accurate positioning estimations, e.g., in a multi-level building.

Furthermore, because the above-described collection of fingerprint(s) is beneficial, such collection of fingerprint(s) could be part of a crowdsourcing process that occurs continuously or at least from time-to-time. For example, mobile devices of a large number of consumers could continuously transmit fingerprint(s) to the positioning server (e.g., server system 102) collecting the fingerprint(s). Consumers may consent to participation in such a collection process, if their device is equipped with necessary functionality to enable the fingerprint generation and/or collection at issue as a background process, naturally with the end-user consent. Also, it could be possible to use volunteers to actively survey area(s) so as to enable collection of fingerprint(s) for those area(s). Other examples are also possible.

Given that collection of fingerprint(s) may allow for understanding of how radio signals behave and travel in an area (e.g., a building), the server system 102 could use the collected fingerprint(s) in various ways to generate or update a radio map for the area.

By way of example, the server system 102 could define a grid having a plurality of points at e.g., intersecting lines. The server system 102 may defined the grid to cover a site such that each grid point corresponds to a geographical location at the site. If the site (e.g., a building) comprises several floors, a separate grid may be defined for each floor, or a single three-dimensional grid may be defined with one dimension for the different floors.

Given this, if the server system 102 collects a fingerprint from a mobile device (e.g., a report that includes RSS value(s), associated radio device identifier(s), and/or other information as discussed), the server system 102 could map (i) RSS value(s) and/or associated radio device identifier(s) included in that fingerprint to (ii) the grid point corresponding to a geographical location that is closest to the position estimate indicated in that fingerprint. The server system 102 could perform such a process respectively for some or all fingerprint(s) collected from mobile device(s) in the site, so as to generate a grid-based radio map for the site.

In this example, if there are several RSS values for the same radio device that would be mapped to the same grid point, the server system 102 could determine an average value (e.g., arithmetic mean or median value) of those RSS values and associate the average value with the grid point at issue. On the other hand, for grid points to which no RSS values could be mapped due to missing fingerprint(s) from the corresponding areas at the site, the server system 102 could generate RSS values by interpolating surrounding RSS values if possible, and by extrapolating neighboring RSS values otherwise. In this way, the server system 102 could generate the radio map to identify radio devices and/or RSS values expected to be observed respectively at each of a plurality of locations throughout the site. Other (e.g., non-grid based) radio maps are also possible.

In some implementations, the radio map could include, be combined with, or otherwise correspond to another map or layout image representing features of an indoor and/or outdoor area at various locations in the area (e.g., an open area map for a pedestrian walkable area as further described herein). In the context of an indoor area, for instance, such features may include rooms, hallways, entryways (e.g., doors), vertical connectors (e.g., elevators, escalators, and/or stairs), and/or items situated in the indoor area (e.g., furniture), among numerous other possibilities. Given this, the radio map could indicate characteristics of the radio environment respectively at or nearby certain features in the area. Moreover, a mobile device could be configured to display such a radio map, to enable automatic or manual assessment of the radio environment in the area. Such an assessment could help determine whether sufficient extent of fingerprint(s) has been collected in a certain location (e.g., near a certain feature), and may provide other advantages as well.

Once a radio map is generated or updated, the server system 102 could store the radio map in a database 108, so that the server system 102 could refer the radio map or a portion thereof on an as-needed basis and/or so that the server system 102 provide the radio map or portion thereof (e.g., to a mobile device) on an as-needed basis for positioning purposes. Generally, the stored radio map could be associated with an indoor or other space (e.g., a particular building) for which the radio map provides coverage. And the server system 102 and/or a mobile device could select a radio map to be used for positioning purposes that is associated with an indoor (or other) space at which or next to which the mobile device is located. In practice, the server system 102 and/or a mobile device could determine an indoor space at which or next to which the mobile device is located based on GNSS measurement(s) by the mobile device and/or an identifier of an access point to which the mobile device is connected, among other options.

In one case, the server system 102 could use the radio map to estimate a position of a mobile device, such as in response to a request by the mobile device to do so. In particular, the server system 102 could receive, from the mobile device, a measurement report indicating identifiers of radio device(s) and/or RSS values that are observable by the mobile device at the current position of the mobile device, and possibly other radio characteristics observable by the mobile device. In some scenarios, the measurement report could optionally also include other information that might aid in determining a position estimate, such as e.g. barometric/altitude information that may assist in determining a floor level as part of the position estimate. Nevertheless, the server system 102 can compare information in the measurement report to the radio map, to determine a position estimate. For example, the server system 102 could determine that radio device identifier(s) and RSS value(s) in the measurement report substantially match radio device identifier(s) and RSS value(s) associated with a particular grid point corresponding to a particular geographical location at the site. In turn, the server system 102 could provide, to the mobile device, a position estimate indicative of the particular geographical location at the site.

In another case, the mobile device could use the radio map (or a portion thereof) to estimate its position. To facilitate this, the mobile device could obtain, from the server system 102, at least a portion of the radio map, and could at least temporarily store the radio map locally. Once the mobile device has the radio map locally stored thereon, the mobile device could use the techniques described above in association with the server system 102 so as to estimate its position (e.g., comparing information in a measurement report to the radio map). In this way, the mobile device could engage in "offline" positioning estimations.

Advantageously, the mobile device could engage in "offline" positioning estimations at times when connectivity between the mobile device and the server system 102 is unavailable, when it is desired to reduce a load on the server system 102 (e.g., reduce the extent of processing by the server system 102), when the mobile device seeks to obtain a position estimate relatively quickly (e.g., a very short time-to-first-fix), or in other situations.

In any case, a position estimate obtained using the above-described positioning solution could be used in various ways. For example, the mobile device could display (e.g., via a display device) an indoor navigation application including, e.g., an open area map of an indoor area and visually indicating a position of the mobile device in the indoor area in accordance with the position estimate obtained as described. Other examples are also possible.

Figure 2A:
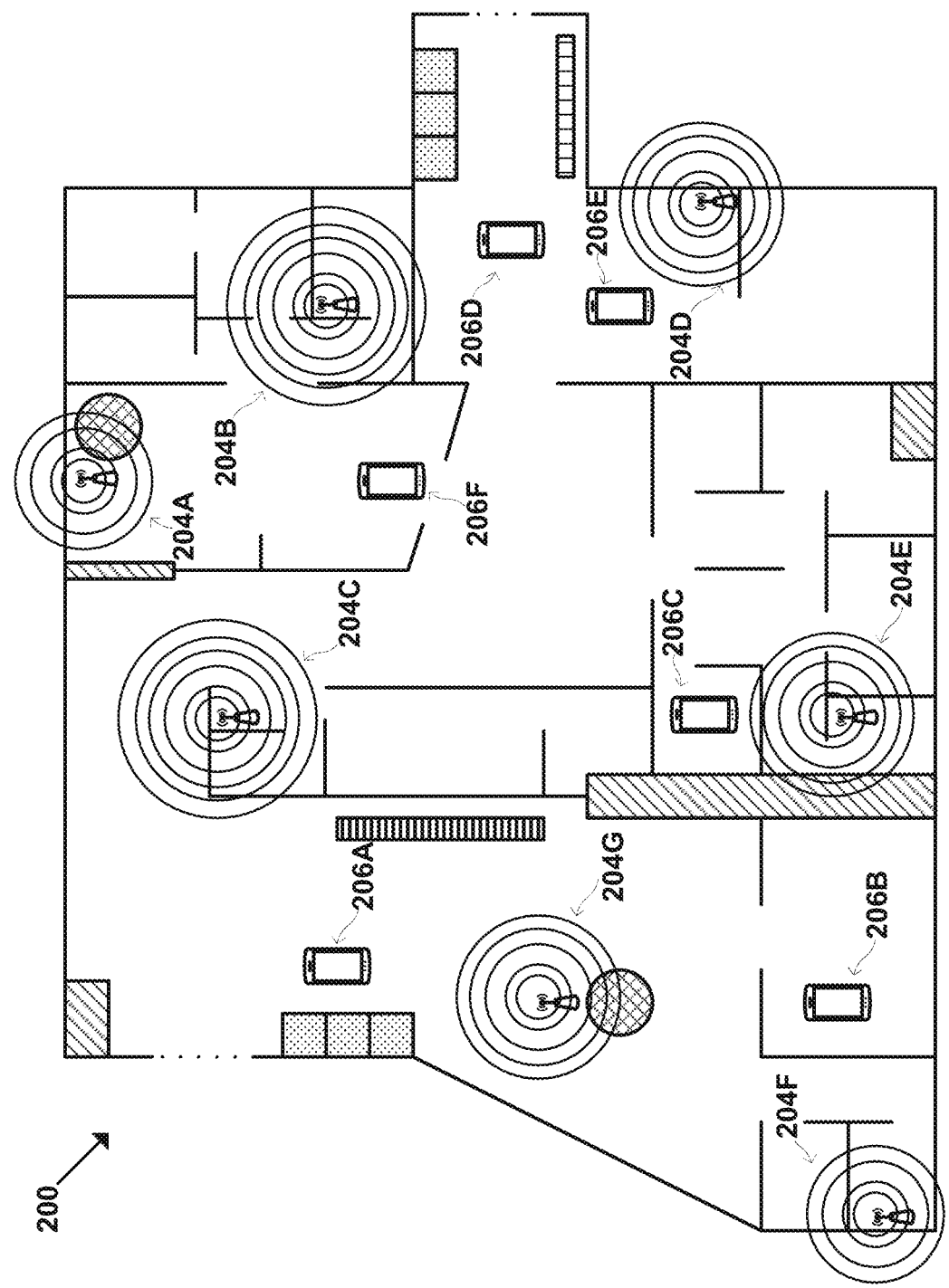
FIGS. 2A and 2B illustrate an indoor area at which radio device(s) and mobile device(s) can be located, in accordance with an example implementation.
Figure 2B:
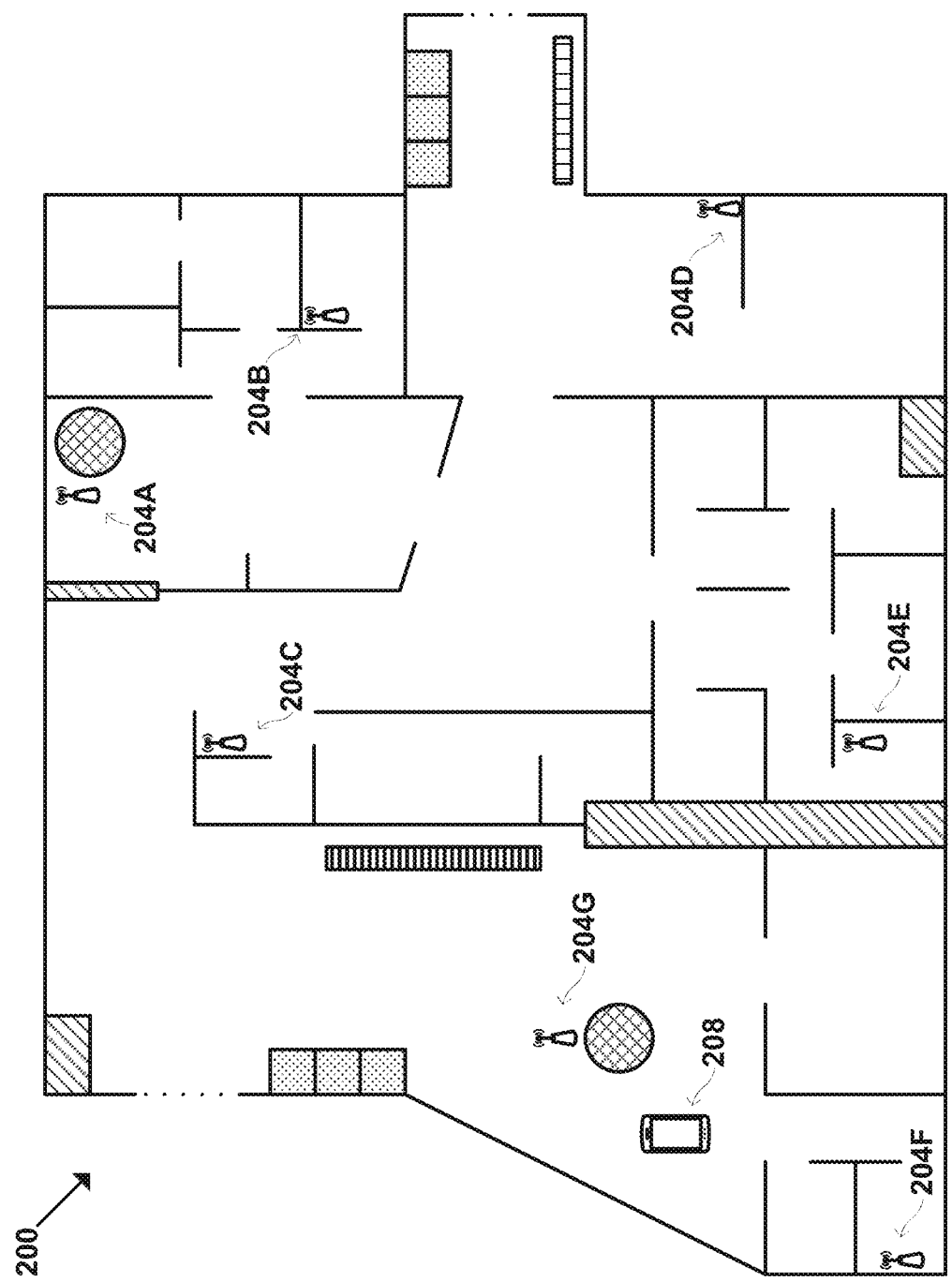
Figure 2C:
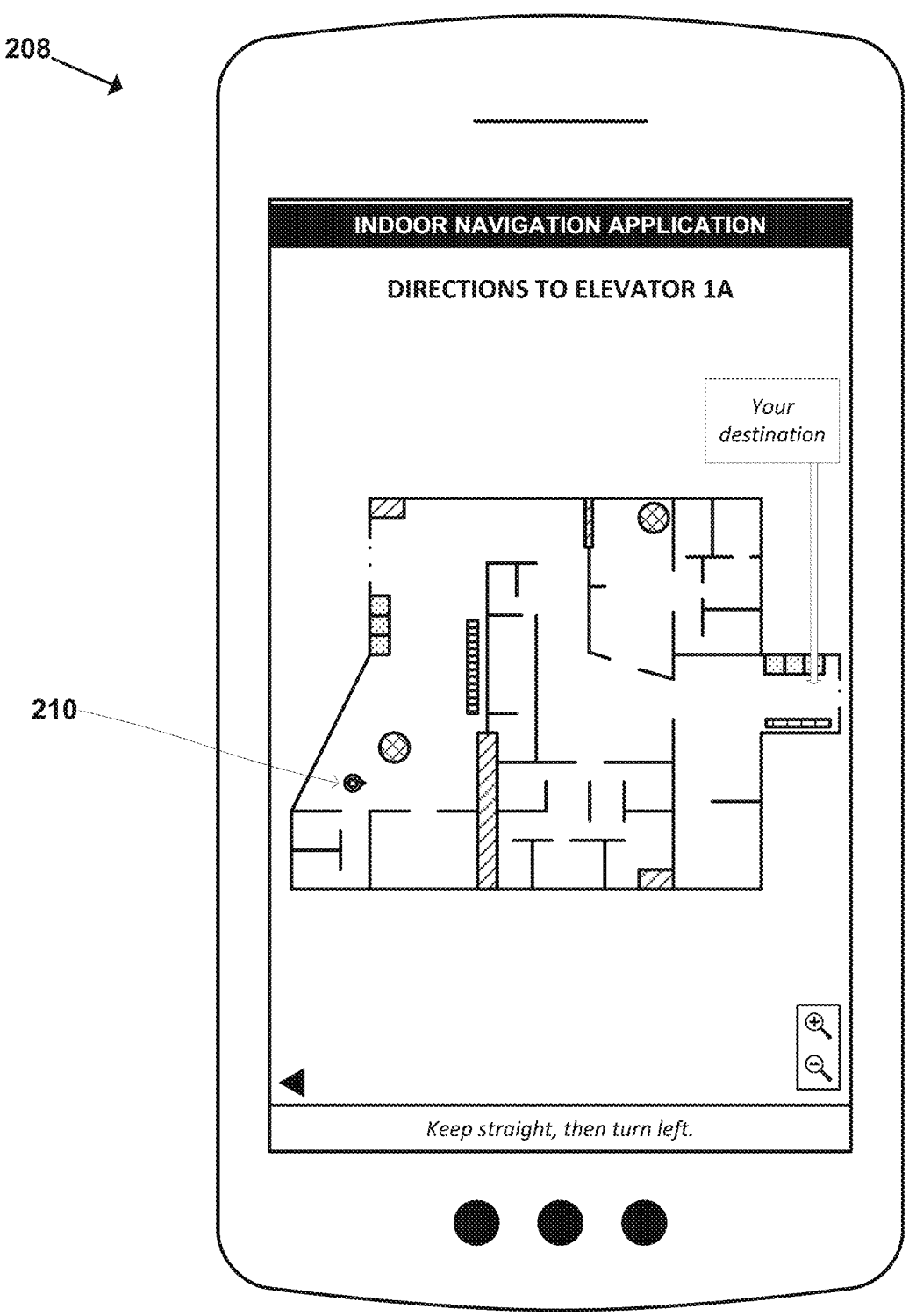
FIG. 2C illustrates an example indoor navigation application, in accordance with an example implementation.

FIGS. 2A to 2C next illustrate an example implementation and use of the above-described positioning solution.

FIG. 2A illustrates an indoor area 200 taking the form of a floor in a building. As shown, several radio devices 204A-204G are positioned throughout the indoor area 200 and several mobile devices 206A-206F are positioned in and/or moving throughout the indoor area 200. Each of the radio devices 204A-204G emits radio signal(s). Of course, it should be understood that such radio signals are shown for illustration purposes only, and that the illustrated signals do not necessarily indicate coverage, strength, and/or other radio characteristics of those signals. In any case, the mobile devices 206A-206F may each respectively measure the radio signals at issue and then transmit, to a positioning server (e.g., server system 102), fingerprint(s) indicating position estimate(s) and the corresponding radio measurement(s). In turn, the positioning server may generate or update a radio map for indoor area 200 as described.

FIG. 2B illustrates a mobile device 208 that is positioned in and/or moving through the indoor area 200. The mobile device 208 could be one of the mobile devices 206A-206F that provided fingerprint(s) as described or could be a different mobile device. In either case, the mobile device 208 could observe characteristics of the radio environment at its current position by measuring radio signals emitted by one or more of the radio devices 204A-204G. The mobile device 208 could then refer to the radio map that was generated or updated as described in associated with FIG. 2A, and could determine a position estimate based on the radio characteristics and the radio map as described. Alternatively, the mobile device 208 could transmit, to the positioning server, a request for a position estimate (e.g., a measurement report), which may indicate the observed radio characteristics at issue. In turn, the position server could determine a position estimate based on the radio characteristics and the radio map as described and could then provide the position estimate to the mobile device 208 in response to the request.

FIG. 2C then illustrates how the mobile device 208 could use the position estimate that was determined using the above-described solution. As shown, the mobile device 208 could display an indoor navigation application that includes an open area map of the indoor area 200 as well as a visual indicator 210 of the mobile device 208's position in accordance with the position estimate at issue. Accordingly, the navigation application could use position estimates obtained as described in order to accurately display the current position of the mobile device 208 and/or to help a user of the mobile device 208 accurately navigate through the indoor area 200, among numerous other possibilities. Other illustrations are also possible.

II. Illustrative Methods

As noted above, the present disclosure is directed to an improved approach for detecting mobile radio node(s), so that those node(s) can be excluded for positioning purposes. The approach involves making a determination that certain condition(s) are met, the condition(s) indicating that a radio node is moving substantially along with a high-speed computing device, and then responding to this determination by deeming the radio node to be a mobile node and excluding that mobile radio node for positioning purposes. Thus, the disclosure approach could help improve positioning performance of an indoor and/or outdoor radio-based positioning system and could provide for other benefits as well.

The disclosed approach may be applicable in any scenario in which a computing device and a radio node are moving substantially along one another, such as in substantially the same speed and/or direction. By way of example (and without limitation), such a scenario could involve the computing device and the radio node both being positioning within a moving vehicle, such as a public transportation vehicle, among other options. Of course, numerous other scenarios may be possible as well without departing form the scope of the present disclosure.

In practice, the computing device could be any portable or non-portable electronic device of any size. In particular, the computing device may be a mobile device (e.g., mobile device 106) that can be movable from one position to another in one or more ways. For instance, the computing device may be movable due to being portable. Alternatively, the computing device may be fixed to or otherwise be stationary with an entity (e.g., vehicle) and move due to movement of that entity. As such, the computing device could be or otherwise include cellular phone(s), personal digital assistant(s), laptop computer(s), desktop computer(s), tablet computer(s), and/or wearable device(s), among other options. Moreover, the computing device could be configured to communicate with server(s) (e.g., server system 102), perform any positioning-related operations described herein, and/or connect to the radio node at issue.

In this regard, the radio node being evaluated (i.e., as being mobile or stationary) could take various forms. As an initial matter, the radio node could be movable due to being portable. Alternatively, the radio node may be fixed to or otherwise be stationary with an entity and move due to movement of that entity (e.g., an access point on a public transportation vehicle). In either case, the radio node could be configured as one of the radio devices 104 described above. For example, in line with the discussion above, the radio node at issue could be a wireless WLAN access point, such as a WLAN access point that supports or is configured according to the IEEE 802.11 standard (e.g., a Wi-Fi access point), a Bluetooth beacon, or a cellular network node, among other options. In other embodiments, the radio node could be a mobile or other device that has been set up in tethering mode, so as to share that device's internet connection with other device(s) via a wired or wireless connection (e.g., a mobile hotspot). Other examples are also possible.

Figure 3:
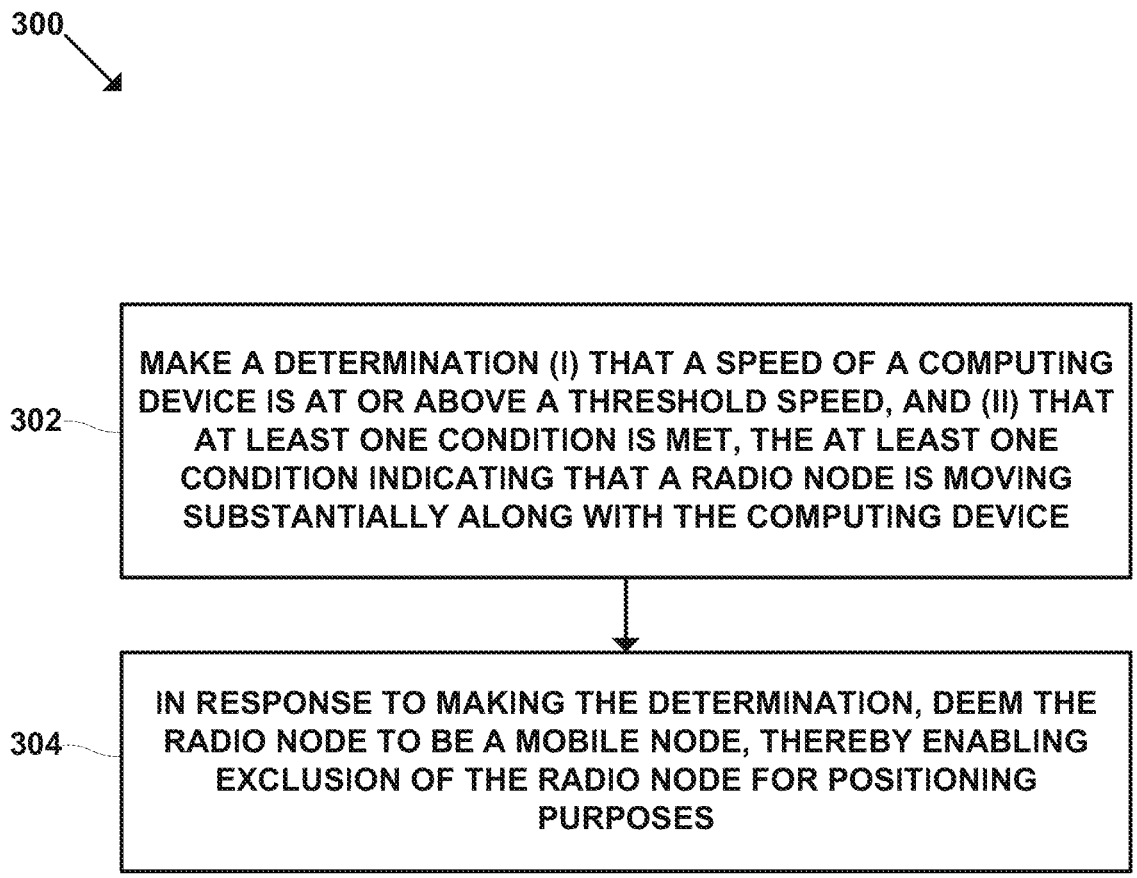
FIG. 3 is an example flowchart related to detecting mobile nodes for improving positioning performance, in accordance with an example implementation.

FIG. 3 is next a flowchart illustrating method 300, in accordance with the present disclosure. Method 300 could be performed by and/or in an arrangement involving a server device, a mobile device, and/or any other device or system. Also, it should be understood that, if a method is performed by a given entity, the given entity could engage in communication(s) with one or more other entities as necessary to obtain and/or provide any feasible information as understood by one of ordinary skill in the art, to enable the given entity to perform operations described herein and/or to inform another entity about results etc. Moreover, in some implementations, the various operations described herein could be distributed among one or more entities, such as in accordance with a client-server arrangement or the like. Other arrangements are also possible.

In an example implementation, method 300 could be performed by and/or in an arrangement involving a positioning system (e.g., server(s) 102) and/or a client of the positioning system, such as a computing device (e.g., mobile device 106), or more particularly by component(s)/module(s) (e.g., processor(s)) thereof, among other possibilities. For sake of simplicity, method 300 is described herein as being performed by processor(s).

At block 302, method 300 involves making a determination, e.g., by one or more processors, (i) that a speed of a computing device is at or above a threshold speed, and (ii) that at least one condition is met, the at least one condition indicating that a radio node is moving substantially along with the computing device.

According to the present disclosure, the processor(s) could determine the speed of the computing device using any technique(s) and/or device(s) currently known and/or developed in the future. For example, the processor(s) could determine the speed of the computing device based on positioning measurements indicating positions of the computing device over time, the positioning measurements bring derived from or in accordance with GNSS positioning, network positioning, sensor fusion device(s) and/or technique(s), among others. Additionally or alternatively, the processor(s) could determine the speed of the computing device directly using one or more of these technologies based on e.g., measurements on the Doppler shift, among other possibilities. In another example, the processor(s) could determine the speed of the computing device based on data from radar device(s), Light Detection and Ranging (LiDAR) device(s), and/or motion sensor(s) (e.g., inertial measurement unit (IMU)), among others. Other examples are also possible.

Additionally, the above-mentioned threshold speed could be established in various ways. For example, the threshold speed could be programmatically defined by way of manual engineering input. In another example, the threshold speed could be user-defined by way of an interface, such as by way of interface feature(s) displayed on a Graphical User Interface (GUI) of a computing device or the like.

As such, the processor(s) could determine whether a speed of a computing device is at or above the threshold speed, to ascertain whether the computing device can at least temporarily be considered a high-speed computing device. For example, the processor(s) could determine that the computing device is moving at 100 kilometers per hour and that this speed exceed a pre-defined threshold speed of 50 kilometer per hour. Thus, the processor(s) may at least temporarily deem the computing device to be a high-speed device. Numerous other examples are also possible.

Before or after determining that a computing device is moving at or above the threshold speed, the processor(s) may determine that one or more relevant conditions are met, the condition(s) indicating that a radio node is moving substantially along with the computing device.

In a first example condition, the processor(s) may determine that the computing device is connected to the radio node at issue, as an indication that the radio node is moving substantially along with the computing device. Typically, it may take the computing device a few seconds to connect to a wireless (e.g., Wi-Fi) network via the radio node. Given this, if the computing device is moving at a high speed and the radio node is static, moving at a significantly lower speed, and/or in a different direction, then the likelihood of the computing device connecting to the radio node (especially for a sufficiently long duration to detect such connectivity) may be relatively low. Whereas, if the radio node is moving substantially in the same speed and direction as the computing device, then the likelihood of such connectivity being established and detected may be relatively high. In any case, the processor(s) may detect such connectivity in various ways, such as based on report(s) received from the computing device to indicate that a connection between the computing device and the radio node has been established.

In a second example condition, the processor(s) may determine that the computing device has been connected to the radio node for at least a respective duration of time, as an indication that the radio node is moving substantially along with the computing device. In this example, the duration of time at issue can be established in various ways, such as by being programmatically defined by way of manual engineering input and/or user-defined by way of input via an interface of a device. Alternatively, the duration of time at issue can be determined based on the determined speed of the computing device, with the duration being shorter as the speed increases and vice versa. For instance, if the computing device's speed is 100 kilometers per hour and assuming a static node has approximate coverage area encompassing a 200 meter diameter, then the computing device is likely to stay in the static node's coverage area for only about 7 seconds and thus is unlikely to remain connected to that node for more than 7 seconds. Given this, if the high-speed computing device does remain connected to a given radio node for more than 7 seconds, then this may server as an indication to the processor(s) that the radio node at issue is likely moving substantially along with the computing device.

In a third example condition, the processor(s) may determine that signal measurements associated with the radio node remain substantially consistent for at least a respective duration of time, as an indication that the radio node is moving substantially along with the computing device. In particular, the computing device may be configured to perform signal measurements respectively for radio signal parameter(s) (e.g., received signal strength and/or signal round-trip-time), and in some cases report those measurements to server(s) as described above. Given this, processor(s) of the computing device and/or of the server(s) may track such measurements over time, to determine whether they remain substantially consistent for at least a certain duration. The extent of variation permitted in the measurements and/or the duration may be pre-defined by way of manual engineering input, may be user-defined, or may be defined in other ways.

For example, a user or engineer may establish that a received signal strength associated with a radio node can change by no more than 5 dBm (e.g., increase or decrease by no more than 5 dBm relative to an initial measurement) and must remain substantially consistent in this manner for at least an 8 second duration. Thus, if the processor(s) determine that the signal measurement associated with the radio node meet this pre-defined criterion, then such may indicate to the processor(s) that the radio node is moving substantially along with the computing device.

In some implementations, the extent of variation in the measurements may not play a role in the aforementioned analysis as long as the measurements at issue indicate presence of the radio node. For instance, the processor(s)

may receive radio scan(s) collected by the computing device, the radio scans respectively including radio measurement(s) respectively associated with radio node(s) in the computing device's vicinity. And if the processor(s) determine (e.g., according to received signal strength measurements) that a given radio node was observed in multiple successive scans spanning at least a certain duration (e.g., 8 seconds), then this may serve as an indication to the processor(s) that the given radio node is moving substantially along with the computing device. Other examples and implementations are possible as well.

In a fourth example condition, the processor(s) may determine that the above-described third condition holds true for multiple radio nodes simultaneously. More specifically, detecting that the third condition holds true for multiple radio nodes simultaneously may correspond to an increased likelihood that separate detections of that third condition are respectively accurate, each such separate detection being for a different radio node of the radio nodes at issue. Thus, the third condition being met for multiple radio nodes may serve as a fourth condition indicating that all those radio nodes at issue are moving substantially along with the computing device.

For instance, in line with the examples set forth above, the processor(s) may receive radio scan(s) collected by the computing device, the radio scans respectively including radio measurement(s) respectively associated with radio node(s) in the computing device's vicinity. And if the processor(s) determine that two or more radio nodes were observed in multiple successive scans spanning at least a certain duration, then this may serve as an indication to the processor(s) that all of the observed radio nodes are moving substantially along with the computing device. Other examples are also possible.

In a fifth example condition, the processor(s) may determine that a received signal strength of a radio node remains strong for a sufficient duration, as an indication that the radio node is moving substantially along with the computing device. Specifically, if the computing device and the radio node are moving substantially in the same direction and speed, there is an increased likelihood that the computing device can observe a received signal strength of that radio node at least at a certain level. Given this, the processor(s) could be configured to determine that the received signal strength associated with the radio node is at or above a threshold signal strength for at least a respective duration of time. In practice, the threshold signal strength and/or the duration of time at issue may be pre-defined by way of manual engineering input, may be user-defined, or may be defined in other ways.

For example, the processor(s) may receive radio scan(s) collected by the computing device, the radio scans including radio measurement(s) respectively associated with radio node(s) in the computing device's vicinity. And the radio node is likely to be mobile if those scans indicate that the computing device observed that radio node with a received signal strength of more than 50 dBm (i) in successive scans spanning a duration of more than one second and/or (ii) in at least a predetermined number of (e.g. at least three) successive scans. As such, the processor(s) could analyze those scans to determine whether such a condition holds true, as an indication of whether the radio node is moving along with the computing device. Other examples are also possible.

In a sixth example condition, the processor(s) may determine that the above-described fifth condition holds true with respect to a radio node having the strongest received signal strength. In particular, the processor(s) could determine that received signal strength measurements associated with the radio node are greater than other received signal strength measurements for at least a certain duration of time. The other received signal strength measurements may be of other radio node(s) observed e.g., in scan(s) by the computing device. And the duration of time at issue may be pre-defined by way of manual engineering input, may be user-defined, or may be defined in other ways. As such, the radio node having the strongest associated signal strength for a sufficient duration of time may serve as an indication that the radio node is moving substantially along with the computing device. For example, the radio node is likely to be mobile if the computing device observe that radio node as the strongest node in multiple scans spanning a time period of at least 7 seconds or more. Other examples are also possible.

Although certain conditions are described herein, other conditions may also be possible without departing from the scope of the present disclosure. In any case, detecting that such condition(s) are met may lead to the processor(s) deeming radio node(s) as being mobile nodes that can move from one position to another and thus degrade positioning performance.

At block 304, method 300 involves, in response to making the determination, deeming, e.g., by the one or more processors, the radio node to be a mobile node, thereby enabling exclusion of the radio node for positioning purposes.

As an initial matter, the process of deeming the radio node to be a mobile node could be facilitated in the context of a client-server arrangement or the like. For example, the computing device could be configured to provide server(s) with information on which radio node(s) are likely mobile. Additionally or alternatively, the server(s) could receive e.g., measurement(s) and/or other relevant information from the computing device (e.g., about the computing device's speed) and then use that received information as basis for determining whether given radio node(s) are mobile.

In either case, processor(s) could analyze the above-described condition(s) in accordance with one or more of various possible implementations.

In an example implementation, the processor(s) could be configured to evaluate one or more of the conditions, to determine whether the radio node is moving substantially along with the high-speed computing device. For example, the processor(s) could determine that the radio node is moving substantially along with the computing device if at least one of the condition(s) at issue holds true. In another example, the processor(s) could determine that the radio node is moving substantially along with the computing device if at least a predetermined number (e.g., three or more) of the conditions hold true. In yet another example, the processor(s) could determine that the radio node is moving substantially along with the computing device if select combination(s) of conditions hold true, such as if e.g., both the first and the fifth conditions both hold true.

Additionally or alternatively, the processor(s) could assign different weights respectively to different conditions as part of the process of determining whether the radio node is mobile. For example, the fourth condition may be assigned a higher weight than the third condition, as it may indicate a higher likelihood for all of the considered nodes being mobile than the third condition. In another example, the second condition may be assigned a higher weight than the remaining conditions, as it could serve as a strong indication that radio node(s) are moving substantially along with the computing device.

In any case, the processor(s) could apply the respective weights in various ways. For instance, the processor(s) could assign a certain value (e.g., one) to a condition when its met and another value (e.g., zero) to a condition when its not met, and could apply corresponding weights respectively to each condition, such as by multiplying a respective value by a corresponding weight for instance. In this way, the processor(s) could compute e.g., a weighted average in accordance with the applied weights, and then determine if that computed weighted average is at or above a pre-defined value (e.g., a value of 0.5). And if the computed weighted average is indeed at or above the pre-defined value, then the processor(s) may responsively determine that the evaluated conditions collectively indicate that the radio node(s) are moving substantially along with the high-speed computing device and are thus mobile.

In some implementations, the processor(s) may deem a radio node to be mobile only if the radio node is repeatedly included in indications corresponding to the radio node being mobile. In other words, rather than having the processor(s) deem the radio node as mobile based on a single such indication, the processor(s) may collect data over time related to whether the radio node is mobile, and may evaluate this data so as to determine whether or not to exclude the radio node for positioning purposes as further descried herein.

For instance, the processor(s) could maintain a counter on indications that a given radio node is mobile and may deem the radio node to be mobile if that counter exceeds a threshold count, perhaps within a pre-defined duration. And in practice, the threshold count and/or the duration may be pre-defined by way of manual engineering input, may be user-defined, or may be defined in other ways. By way example, if the processor(s) make the above-described determination with respect to a given radio node at least five times in less than eight seconds, then the processor(s) may deem the given radio node to be mobile.

Additionally or alternatively, the processor(s) could determine whether a given radio node is mobile in accordance with a crowd-sourcing process. For instance, the processor(s) could collect information associated with that radio node from a plurality of computing devices in accordance with the crowd-sourcing process. A given set of information from a given device could include radio-based measurement(s), data on device speed, and/or data indicating one or more instance(s) of the above-mentioned determination being made (e.g., one or more indications that a radio node is moving substantially along with the computing device), among others. As such, the processor(s) could perform any of the operation(s) described herein in the context of the crowd-sourcing process. For example, the processor(s) could maintain a counter on indications that a given radio node is mobile, regardless of whether those indication(s) are based on information from one or multiple computing devices, and the processor(s) could deem the radio node to be mobile if that counter exceeds a threshold count. Other examples are also possible.

In this way, the processor(s) can avoid false positives by ensuring that suitable radio node(s) are not inadvertently deemed as being mobile and subsequently excluded for positioning purposes, and that unsuitable radio node(s) are deemed as such and thus can be excluded for positioning purposes when applicable.

In accordance with the present disclosure, once a given radio node is deemed to be a mobile radio node, the processor(s) could exclude or otherwise cause exclusion of the radio node for positioning purposes. Such exclusion is set forth herein by way of example in the context of a positioning system, such as the radio-based positioning system described herein.

For instance, a positioning system could rely on the disclosed approach to obtain information about radio node(s) that may need to be excluded from radio map(s). As noted, such radio node(s) may be mobile radio node(s) that change a radio environment due to their movement, thereby leading to radio map(s) no longer accurately representing the radio environment.

Accordingly, the positioning system may use an indication(s) of radio node(s) being mobile as basis for performing a procedure to exclude, from a radio map, one or more of the radio nodes at issue. The positioning system could do so using one or more of various techniques.

In an example implementation, the positioning system could exclude a radio node from a radio map by removing, from the radio map, data associated with the radio node. Such data may include an identifier of the radio node, value(s) associated with radio-related measurement(s) of signals emitted by the radio node, and/or position estimate(s) (e.g., included in fingerprint(s) provided during the above-described crowdsourcing process), among other possibilities.

For example, as discussed, the radio map generation and/or updating process may involve defining a grid to cover a site such that each grid point corresponds to a geographical location at the site. In this process, the positioning system could map RSS value(s) and/or associated radio node identifier(s) respectively to grid point(s). Given this, if the positioning system determines that certain radio node(s) have been deemed as being mobile, the positioning system could remove, from the radio map, any RSS value(s) associated with those radio nodes and/or any identifier(s) of those radio node(s). Such removal procedure could involve deleting value(s)/identifier(s) and/or deleting stored mapping(s) between value(s)/identifier(s) and corresponding grid point(s), among other options.

In some situations, as discussed, the positioning system could generate an RSS value for a particular grid point by interpolating surrounding RSS values if possible, and by extrapolating neighboring RSS values otherwise. In such situations, if one of the surrounding or neighboring RSS values corresponds to a particular radio node and the positioning system determines that this radio node has been deemed as being mobile, the positioning system could responsively re-generate the RSS value for the particular grid point. In doing so, the positioning system could interpolate surrounding RSS values and/or extrapolate neighboring RSS values while disregarding any surrounding and/or neighboring RSS value(s) that correspond to the particular radio node deemed to be mobile, in accordance with the present disclosure. Other examples are also possible.

Additionally or alternatively, the procedure to exclude radio node(s) may involve blacklisting one or more of those radio node(s). In particular, the positioning system may add "unsuitable" radio node(s) (i.e., deemed as being mobile) to a list stored in a database accessible to the positioning system. The list may include radio node(s) that should be excluded from radio map(s), thereby helping to prevent addition, to a radio map, of data associated with those node(s).

For example, if the positioning system receives and/or generates data that is candidate for addition to a radio map, the positioning system could refer to the list to determine whether radio node(s) associated with that data are included in the list. And if the positioning system determines that those radio node(s) are indeed included in that list, the positioning system may not add the associated data to the radio map.

In a more specific example, the positioning system may receive a fingerprint including a position estimate, value(s) of radio-related measurement(s), and an identifier of a radio node. But if the positioning system determines that this radio node has been blacklisted in accordance with the present disclosure, the positioning system may responsively avoid using that fingerprint as basis for generating or updating a radio map. Other examples are also possible.

Furthermore, the positioning system may exclude a radio node from any feasible radio map, and/or may exclude the radio node from one or multiple radio maps. For example, the positioning system may exclude a radio node from a radio map used for generating a position estimate that was deemed to be incorrect. In another example, the positioning system may exclude a radio node from a global radio. Other examples are also possible.

In another implementation, the positioning system may forgo use of data associated with a mobile radio node as basis for determining position(s) in a position determination process. For instance, the positioning system may forgo use of particular data associated with a radio node that is deemed to be mobile. This particular data may be included in a radio map and/or in fingerprint, and the positioning system may forgo use of that particular data whether or not it is added and/or removed from the radio map and/or the fingerprint in line with the discussion above. As such, the positioning system could determine a position, as part of the position determination process, based on data other than the particular data associated with the mobile radio node.

In yet another implementation, the positioning system could apply any feasible machine learning technique(s) to evaluate whether a radio node should be excluded for positioning purposes. For instance, as the positioning system make determination(s) indicating that a given radio node is mobile, the positioning system could store such indications in the form of training data. One or more currently known and/or future-developed machine learning algorithms can then be applied to use this training data as basis for generating a model or the like that indicates whether the radio node is mobile and thus should be excluded from radio map(s). Such algorithms may include regression, instance-based, regularization, decision tree, Bayesian, and/or clustering algorithms, among others. Other examples and implementations are also possible.

Figure 4:
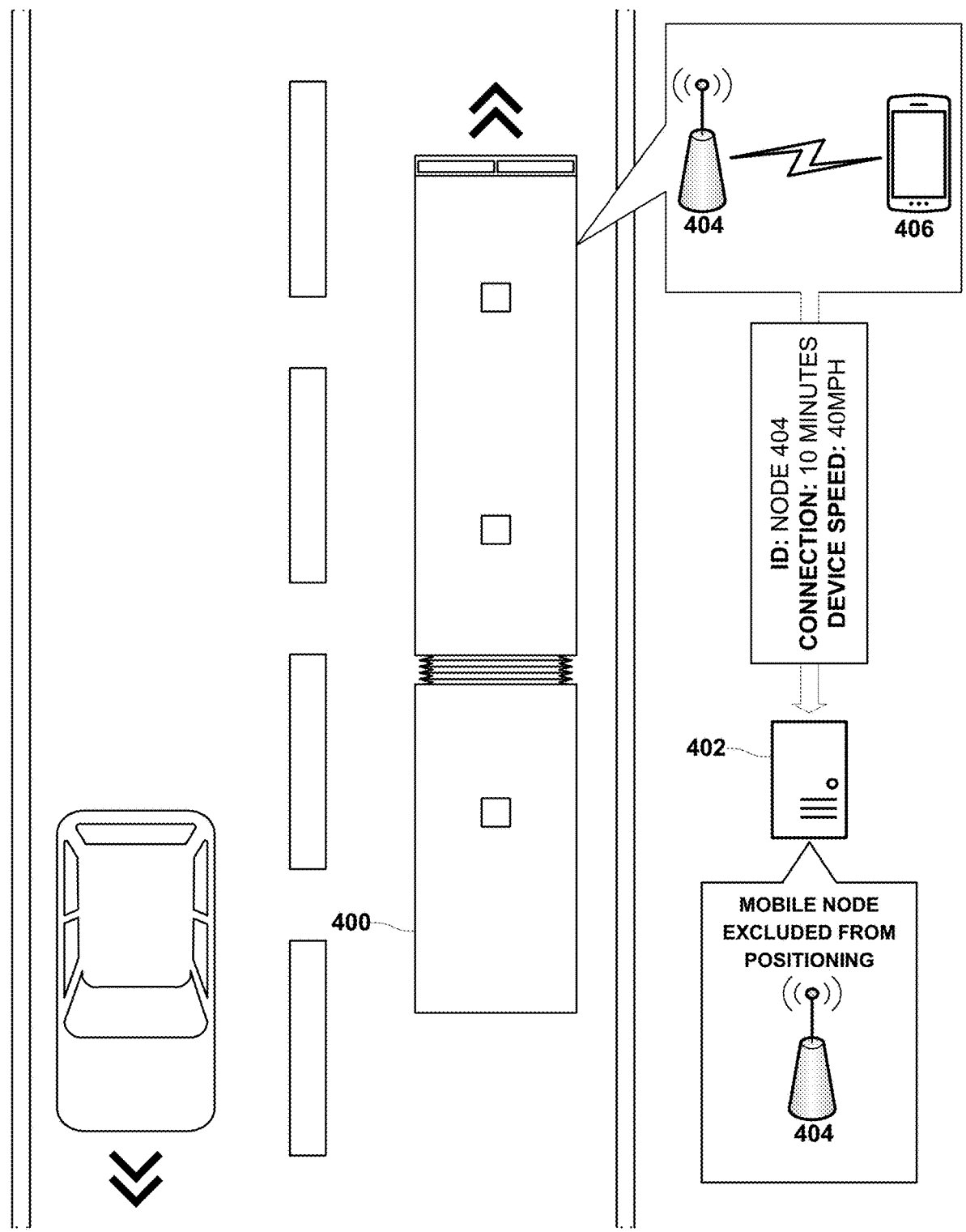
FIG. 4 illustrates an example scenario in which mobile radio node is detected in order to be excluded for positioning purposes, in accordance with an example implementation.

FIG. 4 next illustrates an example scenario in which mobile radio node is detected in order to be excluded for positioning purposes, in accordance with an example implementation. As shown, a radio node 404 is positioned within (e.g., fixed to) a bus 400 that is moving along a road, and thus the radio node 404 moves due to movement of the bus 400, thereby making it a mobile radio node. In an example scenario, a mobile device 406 (e.g., of a bus passenger) could end up being positioned within the bus 400 and thus also move due to movement of the bus 400. In this scenario, the mobile device 406 could collect information that enables making the determination of whether the device 406 is moving at a high-speed and whether at least one of the above-described conditions are met. For instance, as shown, a positioning server 402 could receive, from the device 406, information indicating that the device 406 is moving at 40 miles per hour and has been connected to node 404 for 10 minutes. In turn, the server 402 could determine that the device 406's speed exceeds a threshold speed of 20 miles per hour and that the device 406's connection duration exceeds a threshold duration of 5 minutes, thereby indicating that the node 404 is moving substantially along with the device 406. Thus, the server 402 could responsively deem the node 404 to be a mobile node and could then exclude the node 404 for positioning purposes, which may in turn help improve performance of a radio-based positioning system.

Although certain methods have been described, it should be understood that other processes and/or modification of one or more of the described processes may also be possible in the context of the present disclosure.

III. Example Hardware and Software

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
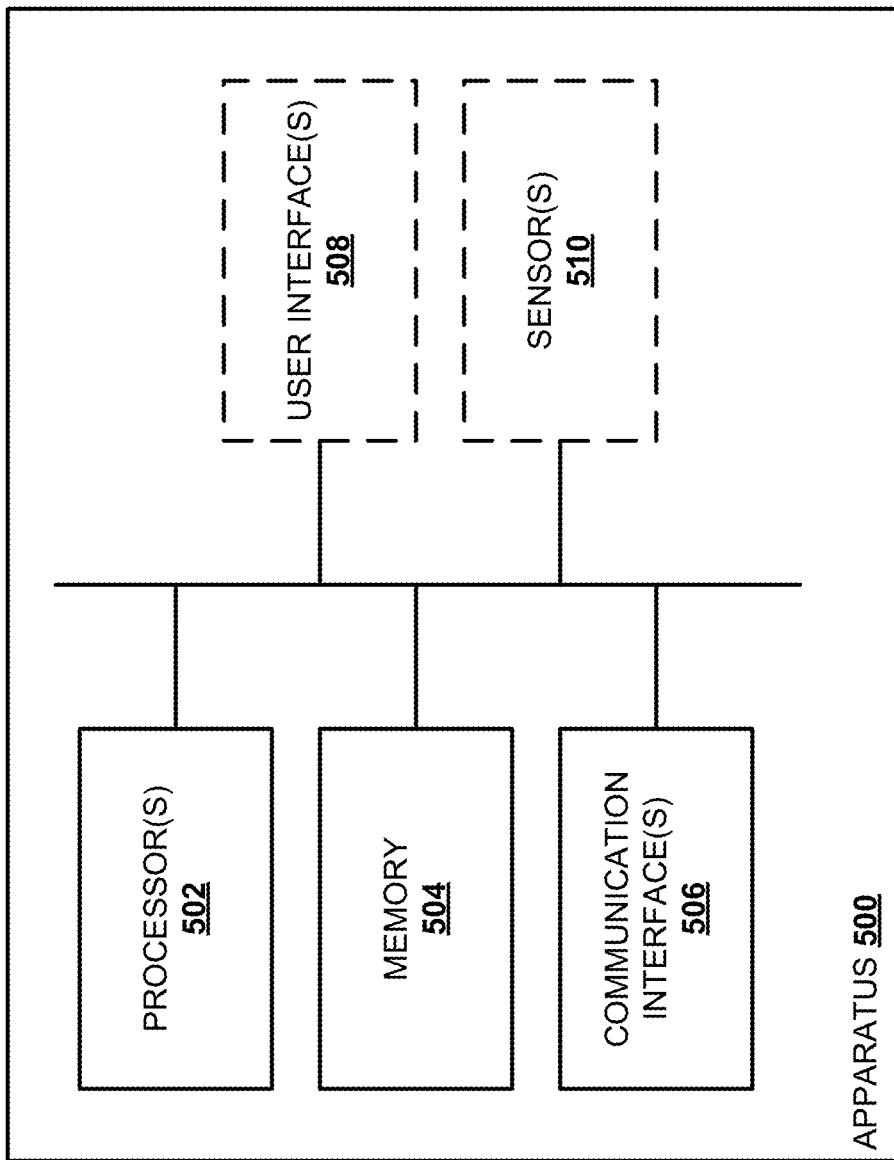
FIG. 5 illustrates an example apparatus, in accordance with an example implementation.

FIG. 5 is a schematic block diagram of an apparatus 500 that may be involved in a feedback loop for improving performance of a radio-based positioning system, according to an example embodiment. The apparatus 500 could, for instance, represent a server (e.g., server system 102) or a mobile device (e.g., one of the mobile devices 106), among other options. Moreover, the apparatus 500 could take the form of or otherwise be part of a system, such as any of those described herein.

As shown, apparatus 500 could include processor(s) 502, a memory 504 (e.g., database 108), communication interface(s) 506, an (optional) user interface(s) 508, and (optional) sensor(s) 510. Some or all of the components of the apparatus 500 may be connected via a bus (or other mechanism) and/or be combined into one or more modules.

Processor(s) 502 could have numerous functions, such as controlling the memory 504, communication interface(s) 506, the user interface(s) 508, and/or the sensor(s) 510 in any feasible manner currently known or developed in the future. For example, the memory 504 could include or otherwise contain computer program code (program instructions), and the processor(s) 502 may be configured to execute the program code to cause the apparatus 500 to perform and/or control operations, such as any of those described herein and/or other operations. Thus, apparatus 500 and/or processor(s) 502 could be referred to as carrying out such operations.

Moreover, processor(s) 502 (and also any other processor(s) mentioned herein) may be processor(s) of any suitable type. For example (and without limitation), processor(s) 502 may include: one or more microprocessor(s), one or more processor(s) with accompanying one or more digital signal processor(s), one or more processor(s) without accompanying digital signal processor(s), one or more special-purpose computer chips, one or more FPGA(s), one or more controller(s), one or more ASIC(s), one or more computer(s), any structure/hardware that has been programmed in such a way to perform described operation(s), and/or an application processor that runs an operating system, among other possibilities.

Furthermore, memory 504 could also take various form without departing from the scope of the present disclosure. In particular, memory 504 could be separate from processor(s) 502. Additionally or alternatively, memory 504 may be part of or otherwise integrated with one or more of the processor(s) 502. In this case, memory 504 may be fixed to the from processor(s) 502 or may be at least partially removable from the processor(s) 502. In any case, the memory 504 be or take the form of volatile and/or non-volatile memory, and could include program memory, working memory, and/or data memory, among others.

By way of example (and without limitation), memory 504 could be or otherwise include: FLASH memory (or a part thereof), any of a Read-Only Memory (ROM), PROM, EPROM and EEPROM memory (or a part thereof), a hard disc (or a part thereof), a Random Access Memory (RAM), and/or Dynamic RAM (DRAM), among others. In some cases, memory 504 may additionally or alternatively include an operating system for processor(s) 502 and/or firmware for apparatus 500. Further, memory 504 could additionally or alternatively be used by processor(s) 502 when executing an operating system and/or computer program. Moreover, memory 504 could additionally or alternatively store data, such as any types, sets, instances, and/or samples of data described herein. Other examples are also possible.

Further, communication interface(s) 506 could enable the apparatus 500 to communicate with other entities. The communication interface(s) 506 may, for instance, include a wireless interface (e.g. a cellular radio communication interface and/or a WLAN interface) and/or wire-bound interface (e.g. an IP-based interface, for instance to communicate with entities via the Internet). Moreover, the communication interface(s) 506 may take the form of or provide for wireless and/or wired communication with transmitting and/or receiving device(s), such as one or more antenna(s) and/or radio receiver(s) of the apparatus 500.

Yet further, user interface(s) 508 could be any device(s) for presenting and/or receiving information. For instance, user interface(s) 508 include display device(s), audio device(s) or the like for visually and/or audibly providing information (e.g., to a user). Additionally or alternatively, user interface(s) 508 could include input device(s) (e.g. a keyboard, keypad, touchpad, mouse, etc.) for receiving information (e.g., based on input provided by a user).

Finally, sensor(s) 510 could include any type(s) of sensor(s) currently known and/or developed in the future. For example, sensor(s) 510 could include a barometric sensor (e.g., to gather pressure information), motion sensor(s) (e.g., inertial measurement unit (IMU)), image capture device(s), position sensor(s), Global Navigation Satellite System (GNSS) receiver(s) (e.g., in the form of a Global Positioning System (GPS) receiver), and/or any (currently known and/or future-developed) sensor(s) that enable the apparatus 500 to perform radio measurements (e.g., Bluetooth and/or Wi-Fi receiver(s)), among other possibilities.

In a further aspect, the term "computer-readable medium" as used herein may refer to any medium that participates in providing information to processor(s), including instructions for execution. Such a medium may take many forms, including, but not limited to computer-readable storage medium (e.g., non-volatile media, volatile media), and/or transmission media. Non-transitory media, such as non-volatile media, may include, for example, optical or magnetic disks, such as storage device. Volatile media may include, for example, a dynamic memory. Transmission media may include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media.

Generally speaking, common forms of computer-readable media may include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read.

In some cases, the term computer-readable storage medium may be used herein to refer to any computer-readable medium except transmission media. Further, logic encoded in one or more tangible media may includes processor instructions on a computer-readable storage media and/or special purpose hardware (e.g., ASIC).

In practice, a computer-readable storage medium could have stored thereon instructions executable by processor(s) to cause an apparatus to perform operations, such as any of those described herein. Accordingly, a computer program could be stored in a computer readable storage medium in the form of instructions encoding the computer readable storage medium. The computer-readable storage medium may be intended for taking part in the operation of a device, like an internal or external memory or hard disk of a computer, or be intended for distribution of the program, like an optical disc, among other options.

IV. Example Geographic Database

Figure 6:
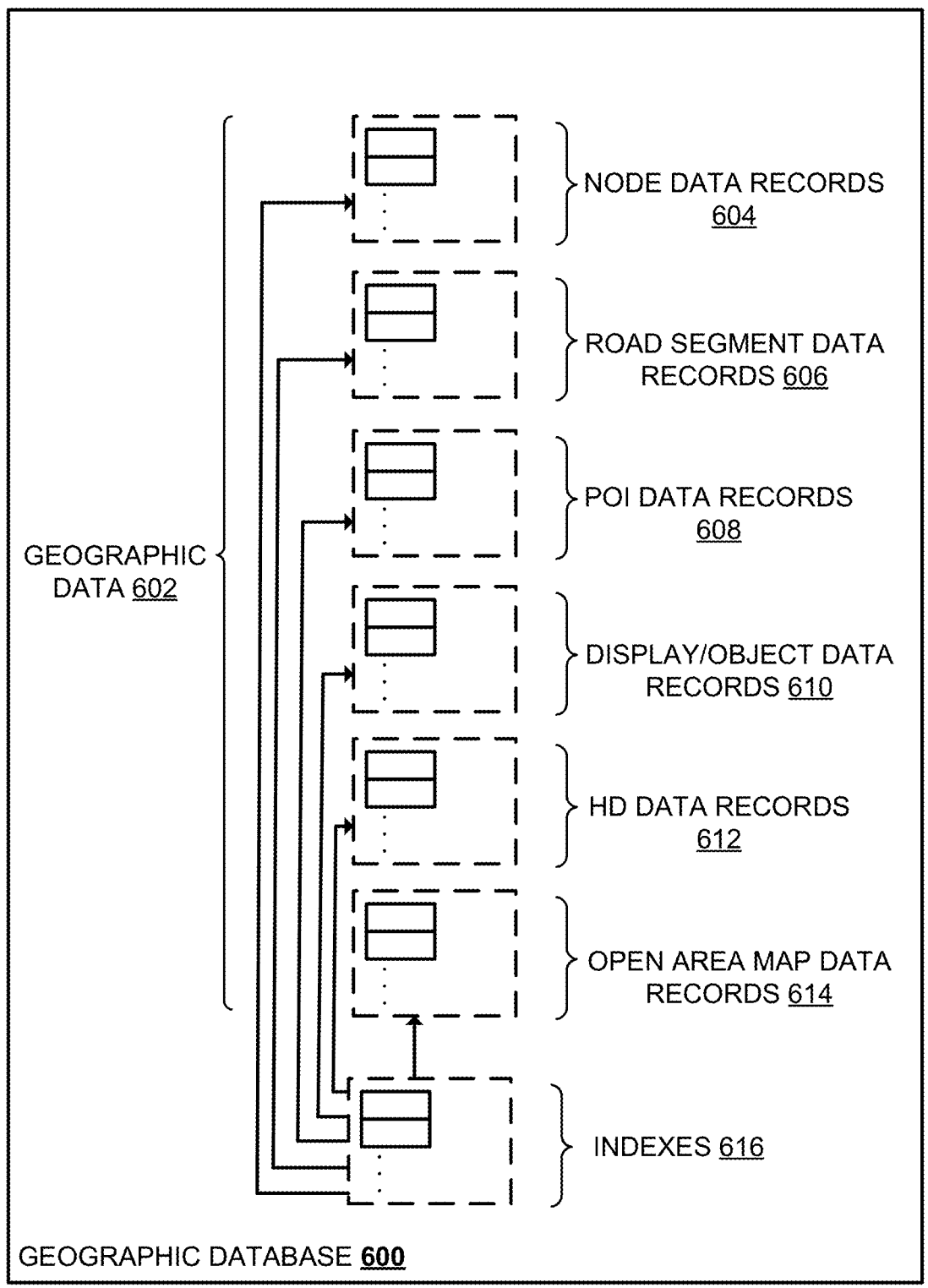
FIG. 6 illustrates a diagram of a geographic database, in accordance with an example implementation.

FIG. 6 illustrates a diagram of a geographic database 600, according to an example implementation. Geographic database 600 could be included within, integrated with, or be seperate from another database, data storage device, memory, or the like described herein (e.g., memory 504). Additionally or alternatively, geographic database 600 could be stored on or otherwise made accessible to any entity described herein without departing from the scope of the present disclosure. Moreover, although certain aspects of the geographic database are described in the context of outdoor mapping and/or outdoor navigation-related services, it should be understand that some or all such aspects could extend to apply in the context of indoor mapping and/or indoor navigation-related services.

In this regard, the terms indoors, indoor area, indoor space, indoor environment, or the like used herein could refer any physical area/space that is at least partially enclosed, such as, e.g., for purpose of at least partially covering people and/or object(s) (e.g., a building, home, venue, tunnel, etc.) And the terms outdoors, outdoor area, outdoor space, outdoor environment, or the like used herein could refer to any physical areas/spaces other than those that are indoors (e.g., a park, street, intersection, sidewalk, beach, plaza, etc.) Of course, the terms indoors and outdoors or the like can be defined in other ways as well.

More specifically, the geographic database 600 may include geographic data 602 used for (or configured to be compiled to be used for) mapping and/or navigation-related services. For instance, the geographic database 600 may include high resolution or high definition (HD) mapping data that provide centimeter-level or better accuracy of map features. By way of example, the geographic database 600 can be based at least in part on Light Detection and Ranging (LiDAR) and/or other technology to collect billions of 3D points and model road surfaces (and/or other map features down), e.g., to the number lanes and their widths. In some cases, the HD mapping data (e.g., HD data records 612) may capture and store details such as the slope and curvature of the road, lane markings, roadside objects such as sign posts, including what the signage denotes, and/or shape/sizes of indoor objects, hallways, rooms etc. In practice, the HD mapping data may enable precise localization of an entity on a road and/or in a building, and/or may enable determination of map data updates (e.g., learned speed limit values) to at high accuracy levels, among other options.

In the geographic database 600, geographic features (e.g., two-dimensional or three-dimensional features) may be represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In this regard, the following terminology may apply to the representation of geographic features in the geographic database 600.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In an example implementation, the geographic database 600 may follow certain conventions. For example, links might not cross themselves and might not cross each other except at a node. Also, there may be no duplicated shape points, nodes, or links. Two links that connect each other may have a common node. In the geographic database 600, overlapping geographic features may be represented by overlapping polygons. When polygons overlap, the boundary of one polygon may cross the boundary of the other polygon. In the geographic database 600, the location at which the boundary of one polygon intersects the boundary of another polygon may be represented by a node. In an embodiment, a node may be used to represent other locations along the boundary of a polygon than a location at which the boundary of the polygon intersects the boundary of another polygon. Additionally or alternatively, a shape point may not be used to represent a point at which the boundary of a polygon intersects the boundary of another polygon.

In an example implementation, the geographic database 600 may be stored as a hierarchical or multi-level tile-based projection or structure. More specifically, in one embodiment, the geographic database 600 may be defined according to a normalized Mercator projection. Other projections may be used. By way of example, the map tile grid of a Mercator or similar projection may be a multilevel grid. Each cell or tile in a level of the map tile grid may be divisible into the same number of tiles of that same level of grid. In other words, the initial level of the map tile grid (e.g., a level at the lowest zoom level) may be divisible into four cells or rectangles. Each of those cells are in turn divisible into four cells, and so on until the highest zoom or resolution level of the projection is reached.

In some implementations, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. Further, each cell may be divided into four rectangles and numbered by concatenating the parent tile ID and the new tile position. A variety of numbering schemes also is possible. Any number of levels with increasingly smaller geographic areas may represent the map tile grid. Any level (n) of the map tile grid may have $2(n+1)$ cells. Accordingly, any tile of the level (n) has a geographic area of $A/2(n+1)$ where A is the total geographic area of the world or the total area of the map tile grid 10. Because of the numbering system, the exact position of any tile in any level of the map tile grid or projection may be uniquely determined from the tile ID.

In this regard, a system may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In an embodiment, the quadkey is an example of the hash or encoding scheme of the respective geographical coordinates of a geographical data point that can be used to identify a tile in which the geographical data point is located.

As shown, the geographic database 600 may include node data records 604, road segment or link data records 606, Points of Interest (POI) data records 608, display/object data records 610, HD mapping data records 612, open area map data records 614, and indexes 616, for example. More, fewer or different data records can be provided. For example, other data records can include cartographic data records, routing data, and/or maneuver data. Further, the indexes 616 may improve the speed of data retrieval operations in the geographic database 600. For instance, the indexes 616 may be used to quickly locate data without having to search every row in the geographic database 600 every time it is accessed. For example, in one embodiment, the indexes 616 can be a spatial index of the polygon points associated with stored feature polygons.

In exemplary embodiments, the road segment data records 606 may be links or segments representing roads, streets, or paths, as can be used in a calculated or recorded route information for determination of one or more personalized routes. The node data records 604 may be end points corresponding to the respective links or segments of the road segment data records 606. The road link data records 606 and the node data records 604 may represent a road network, such as used by vehicles, cars, and/or other entities. Alternatively, the geographic database 600 can contain path segment(s) and node data records or other data that represent pedestrian paths or areas in addition to or instead of the vehicle road record data (e.g., paths and/or areas for indoor and/or outdoor positioning and/or navigation), for example.

The road/link segments and nodes can be associated with attributes, such as geographic coordinates, street names, address ranges, speed limits, turn restrictions at intersections, and other navigation related attributes, room names/identifiers, vertical connector names/identifiers, as well as POIs, such as gasoline stations, hotels, restaurants, museums, stadiums, offices, automobile dealerships, auto repair shops, buildings, stores, parks, interior building features etc. The geographic database 600 can include data about the POIs and their respective locations in the POI data records 608. The geographic database 600 can also include data about places, such as cities, towns, or other communities, and other geographic features, such as bodies of water, mountain ranges, etc. Such place or feature data can be part of the POI data records 608 or can be associated with POIs or POI data records 608 (such as a data point used for displaying or representing a position of a city). Other examples are also possible.

In some implementations, the geographic database 600 can include display/object data records 610 for storing machine-readable visual representations and map data decoded from the visual representations and their respective properties. In addition, the display/object data records 610 can store post-processing rule sets for correcting and/or reducing the uncertainties in the display/object data decoded from clustered machine-readable visual representations. The display/object data records 600 can also store data selection rules (e.g., in a map data extension layer) for selecting from among multiple sets of readings of a machine-readable visual representation. The display/object data records 600 can also store confidence or accuracy determinations for the decoded map data. By way of example, the display/object data records 600 can be associated with one or more of the node records 604, road segment records 606, and/or POI data records 608 to support uses cases such as enhanced mapping user interaces (UIs), autonomous driving, dynamic map updates, etc. In some cases, the display/object data records 610 may be stored as a data layer of the hierarchical tile-based structure of the geographic database 600 according to the various embodiments described herein.

In some implementations, as discussed above, the HD mapping data records 612 could model map features to centimeter-level or better accuracy. The HD mapping data records 911 may be divided into spatial partitions of varying sizes to provide HD mapping data to vehicles and/or other devices with near real-time speed without overloading the available resources of the vehicles and/or devices (e.g., computational, memory, bandwidth, etc. resources).

In an example implementation, the geographic database 600 can be maintained by a content provider in association with a services platform (e.g., a map developer). The map developer can collect geographic data to generate and/or enhance the geographic database 600. There can be different ways used by the map developer to collect data. These ways can include obtaining data from other sources, such as municipalities or respective geographic authorities. Additionally or alternatively, the map developer can employ field personnel to travel along roads and/or inside buildings (or other indoor areas) throughout the geographic region to observe features and/or record information about them, for example. Additionally or alternatively, remote sensing, such as aerial or satellite photography, can be used.

Generally, the geographic database 600 can be a master geographic database stored in a format that facilitates updating, maintenance, and/or development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data can be compiled (such as into a platform specification format (PSF)) to organize and/or configure the data for performing navigation-related functions and/or services, such as route calculation, route guidance, map display, speed calculation, distance and travel time functions, and other functions, by a navigation or other device. The navigation-related functions can correspond to vehicle navigation, pedestrian navigation, or other types of navigation. The compilation to produce end user databases can be performed by a party or entity separate from the map developer. For instance, a customer of the map developer, such as a navigation device or other end user device developer, can perform compilation on a received geographic database in a delivery format to produce one or more compiled navigation databases.

In a further aspect, as noted, the geographic database 600 could additionally or alternatively include open area map data record(s) 614 for open area map(s). Generally speaking, open area map(s) may include image(s) or the like of respective layout(s) representing pedestrian walkable area(s) (e.g., indoor area(s), such as one or more floors of a building), and may be configured, separately or together, to enable or otherwise provide point-to-point routing within the layout(s). For example, in line with the discussion above, a radio map could include, be combined with, or otherwise correspond to an open area map representing features of an indoor and/or outdoor area at various locations in the area, to enable positioning and/or navigation solution(s) for the area. Other examples are also possible.

In an example implementation, an open area map may be positioned in, on, or over a geographic map or database (e.g., geographic database 600). The geographic map may be or include geographic data (e.g., any feasible data from records 604-612) corresponding to an area other than (or perhaps at least partially overlapping with) the area represented in the open area map. Also, the geographic map may represent compiled data that corresponds to a database or map configured for vehicle and/or pedestrian navigation. Alternatively, the geographic map may correspond to any real-world or geographic map or data that may or may not be used for navigation or routing. In any case, the geographic map may, e.g., include, but is not limited to, a road network. The road network may represent real-world roads or paths, such as in a city or other geographic region. Navigation attributes and POIs may also be provided.

In this regard, the open area map may be associated or linked with the geographic map or data. For example, one or more points or coordinates of the open area map may be aligned or positioned in or with one or more points or coordinates of the geographic map or data. In one embodiment, coordinates corresponding to tiles, objects, or other portion of the open area map may be in, translated to, or converted to real-world coordinates, such as longitude or latitude, Universal Transverse Mercator ("UTM") coordinates, or other rectangular or 3D coordinates, such as altitude or elevation points. Based on the real-world coordinates, the open area map or data thereof may be placed, positioned, or aligned with or within the geographic map.

For example, nodes, segments, or other features of the geographic map may correspond to real-world coordinates, such as longitude, latitude, and/or UTM coordinates as well as elevation or altitude information. Accordingly, by knowing the real-world coordinates of the open area map, the open area map may be accurately linked to a real-world position or location in the geographic map (e.g., geographic database 600 and/or a display). Additionally or alternatively, the coordinates or points of the open area map or data thereof may be linked or associated with a road network, such as road segments, nodes, and/or other features, without reference to real-world coordinates.

Given this, an end user may perform point-to-point routing using the open area map while viewing a surrounding geographic area or map. Also, the open area map may be linked to the geographic map for navigation or routing purposes, such as via point or navigation data.

For example, an end user may want to navigate or route from inside the open area map to a point external to the open area map that is covered in the geographic map, or vice versa (e.g., an indoor-to-outdoor transition and/or an outdoor-to-indoor transition). Accordingly, a route may be calculated and/or displayed in the open area map (e.g., in the context of indoor navigation), and then from a transition point or area, the route or second route (a continuing route to a selected destination outside of the open area map) may be calculated and/or displayed based on route calculation of the geographic map.

In this regard, in some cases, the navigation or routing of the geographic map may be different than the point-to-point routing of the open area map. For example, the routing of the geographic map may be based on vehicle and/or pedestrian navigation attributes of set roadways, and the routing of the open area map may be based on pedestrian navigation attributes of set indoor features (e.g., hallways, lobbies, rooms etc.) But in other cases, the navigation or routing of the geographic map could be the same as or similar to the point-to-point routing of the open area map.

In any case, in other implementations, an open area map may be positioned in or associated with the geographic map without being linked or tied in with navigation or routing features or functions of the geographic map. Namely, the routing or navigation of at least some open area map(s) may be independent or separate from routing or navigation of an associated geographic map. Other examples and aspects are also possible.

V. Conclusion

Any connection described herein is to be understood in a way that the involved components are operationally coupled. Thus, the connection(s) can be direct or indirect with any number or combination of intervening elements, and there may be merely a functional relationship between the components.

Moreover, any of the methods, processes and actions described or illustrated herein may be implemented using executable instructions in a general-purpose or special-purpose processor(s) and stored on a computer-readable storage medium (e.g., disk, memory, or the like) to be executed by such processor(s).

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the disclosure on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The present disclosure has been described by means of example embodiments. It should be noted that there are alternative ways and variations which are obvious to a skilled person in the art and can be implemented without deviating from the scope of the present disclosure.

Many modifications and other embodiments of the present disclosure set forth herein will come to mind to one skilled in the art to which the present disclosure pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the present disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the present disclosure. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method comprising:
making a determination, by one or more processors, (i) that a speed of a computing device is at or above a threshold speed, and (ii) that at least one condition is met, the at least one condition indicating that a radio node is moving substantially along with the computing device, wherein making the determination that the at least one condition is met comprises determining that the computing device is connected to the radio node and that the computing device has been connected to the radio node for at least a respective duration of time; and
in response to making the determination, deeming, by the one or more processors, the radio node to be a mobile node, thereby enabling exclusion of the radio node for positioning purposes.

2. The method of claim 1,
wherein the computing device is configured to perform signal measurements respectively for one or more radio signal parameters in association with the radio node, and
wherein making the determination that the at least one condition is met comprises determining that the signal measurements associated with the radio node remain substantially consistent for at least a respective duration of time.

3. The method of claim 2,
wherein the computing device is configured to perform signal measurements respectively for one or more radio signal parameters in association with at least one other radio node, and
wherein making the determination that the at least one condition is met further comprises determining that the signal measurements associated with the at least one other radio node also remain substantially consistent for at least a respective duration of time.

4. The method of claim 2, wherein the one or more radio signal parameters comprise one or more of (i) a received signal strength or (ii) a signal round-trip-time.

5. The method of claim 1,
wherein the computing device is configured to perform measurements to determine a received signal strength associated with the radio node, and
wherein making the determination that the at least one condition is met comprises determining that the received signal strength associated with the radio node is at or above a threshold signal strength for at least a respective duration of time.

6. The method of claim 1,
wherein the computing device is configured to perform received signal strength measurements respectively in association with a plurality of radio nodes, and
wherein making the determination that the at least one condition is met comprises determining that received signal strength measurements associated with the radio node are greater than other received signal strength measurements for at a respective duration of time.

7. The method of claim 1, further comprising:
based on the radio node being deemed to be a mobile radio node, excluding or causing exclusion, by the one or more processors, of the radio node for positioning purposes.

8. The method of claim 7, wherein excluding or causing exclusion of the radio node for positioning purposes comprises:
excluding or causing exclusion of the radio node from a radio map used as basis for generating one or more position estimates.

9. The method of claim 8, wherein excluding or causing exclusion of the radio node from the radio map comprises one or more of:
(i) removing, from the radio map, data associated with the excluded radio node, or
(ii) backlisting the excluded radio node to prevent addition, to the radio map, of data associated with the excluded radio node.

10. The method of claim 9, wherein the data associated with the excluded radio node corresponds to one or more of the following: (i) a respective identifier of the excluded radio node, (ii) one or more measurements of radio signals respectively emitted by the excluded radio node, or (iii) one or more position estimates determined based on one or more of the measurements.

11. The method of claim 7, wherein excluding or causing exclusion of the radio node for positioning purposes comprises:
forgoing use of data associated with the excluded radio node as basis for determining one or more positions in a position determination process.

12. The method of claim 1, wherein the one or more processors are of the computing device or of a positioning server configured to at least partially execute a position determination process.

13. An apparatus comprising:
one or more processors;
a non-transitory computer readable medium; and
program instructions stored on the non-transitory computer readable medium and executable by the one or more processors to:
make a determination (i) that a speed of a computing device is at or above a threshold speed, and (ii) that at least one condition is met, the at least one condition indicating that a radio node is moving substantially along with the computing device; and
in response to making the determination, deem the radio node to be a mobile node, thereby enabling exclusion of the radio node for positioning purposes, wherein the apparatus comprises or is a part of the computing device or a positioning server.

14. The apparatus of claim 13, wherein the program instructions are further executable to exclude or cause exclusion of the radio node for positioning purposes.

15. The apparatus of claim 14, wherein excluding or causing exclusion of the radio node for positioning purposes comprises one or more of:
(i) excluding or causing exclusion of the radio node from a radio map used as basis for generating one or more position estimates, or
(ii) forgoing use of data associated with the excluded radio node as basis for determining one or more positions in a position determination process.

16. A non-transitory computer readable medium having stored thereon instructions executable by one or more processors to cause a computing device or a server device to perform operations comprising:

making a determination (i) that a speed of a computing device is at or above a threshold speed, and (ii) that at least one condition is met, the at least one condition indicating that a radio node is moving substantially along with the computing device, wherein making the determination that the at least one condition is met comprises determining that the computing device is connected to the radio node and that the computing device has been connected to the radio node for at least a respective duration of time; and in response to making the determination, deeming the radio node to be a mobile node, thereby enabling exclusion of the radio node for positioning purposes.

17. The non-transitory computer readable medium of claim 16, the operations further comprising:

excluding or causing exclusion of the radio node for positioning purposes.

18. A method comprising:

making a determination, by one or more processors, (i) that a speed of a computing device is at or above a threshold speed, and (ii) that at least one condition is met, the at least one condition indicating that a radio node is moving substantially along with the computing device, wherein the computing device is configured to perform signal measurements respectively for one or more radio signal parameters in association with the radio node, and wherein making the determination that the at least one condition is met comprises determining that the signal measurements associated with the radio node remain substantially consistent for at least a respective duration of time; and in response to making the determination, deeming, by the one or more processors, the radio node to be a mobile node, thereby enabling exclusion of the radio node for positioning purposes.

19. A method comprising:

making a determination, by one or more processors, (i) that a speed of a computing device is at or above a threshold speed, and (ii) that at least one condition is met, the at least one condition indicating that a radio node is moving substantially along with the computing device, wherein the computing device is configured to perform measurements to determine a received signal strength associated with the radio node, and wherein making the determination that the at least one condition is met comprises determining that the received signal strength associated with the radio node is at or above a threshold signal strength for at least a respective duration of time; and in response to making the determination, deeming, by the one or more processors, the radio node to be a mobile node, thereby enabling exclusion of the radio node for positioning purposes.

\* \* \* \* \*